(12) United States Patent
Murabayashi

(10) Patent No.: US 7,759,290 B2
(45) Date of Patent: Jul. 20, 2010

(54) EXHAUST GAS PURIFYING CATALYST

(75) Inventor: Katsunori Murabayashi, Kakegawa (JP)

(73) Assignee: Cataler Corporation, Shizuoka (JP)

( * ) Notice: Subject to any disclaimer, the term of this patent is extended or adjusted under 35 U.S.C. 154(b) by 0 days.

(21) Appl. No.: 12/084,985

(22) PCT Filed: Nov. 21, 2006

(86) PCT No.: PCT/JP2005/021752
§ 371 (c)(1),
(2), (4) Date: May 14, 2008

(87) PCT Pub. No.: WO2007/057981
PCT Pub. Date: May 24, 2007

(65) Prior Publication Data
US 2009/0203515 A1    Aug. 13, 2009

(51) Int. Cl.
*B01J 21/00*    (2006.01)
(52) U.S. Cl. ...................................... 502/439; 502/435
(58) Field of Classification Search .................. 502/439, 502/435
See application file for complete search history.

(56) References Cited

U.S. PATENT DOCUMENTS

| 6,916,450 B2 * | 7/2005 | Akama et al. ............... 422/180 |
| 6,967,186 B2 * | 11/2005 | Takaya et al. ............... 502/325 |
| 2003/0083193 A1 | 5/2003 | Takaya et al. |

FOREIGN PATENT DOCUMENTS

| JP | A 61-78438 | 4/1986 |
| JP | A-62-065746 | 3/1987 |
| JP | A 62-68544 | 3/1987 |
| JP | A-01-168311 | 7/1989 |
| JP | A 4-276113 | 10/1992 |
| JP | A 8-114116 | 5/1996 |
| JP | A 2001-252565 | 9/2001 |
| JP | A-2002-512880 | 5/2002 |
| JP | A 2003-200049 | 7/2003 |
| JP | A 2005-193170 | 7/2005 |
| JP | A 2005-334801 | 12/2005 |
| WO | WO 99/55459 | 11/1999 |

* cited by examiner

Primary Examiner—Timothy C Vanoy
Assistant Examiner—Michelle Hou
(74) Attorney, Agent, or Firm—Oliff & Berridge, PLC

(57) ABSTRACT

To provide an exhaust gas purifying catalyst capable of exhibiting designed characteristics without incurring a material loss.

An exhaust gas purifying catalyst (1) of the present invention is characterized in that the catalyst comprises a catalyst support substrate (10) having a plurality of cells to be axially passed through by exhaust gases; a first catalyst portion (11) having a first carrier layer formed on a surface of the cells of the catalyst support substrate and a first catalytic metal loaded on the first carrier layer; and a second catalyst portion (12) having a second carrier layer formed on a surface of the cells of the catalyst support substrate where the first catalyst portion is not formed and a second catalytic metal loaded on the second carrier layer, and that the catalyst support substrate (10) is exposed between the first catalyst portion (11) and the second catalyst portion (12). In the exhaust gas purifying catalyst of the present invention, the catalyst portions are formed as catalytically designed without incurring a material loss, and pressure loss is suppressed from increasing.

6 Claims, 2 Drawing Sheets

EXHAUST GAS PURIFYING CATALYST

TECHNICAL FIELD

The present invention relates to an exhaust gas purifying catalyst for purifying exhaust gases emitted from an internal combustion engine such as an automotive engine.

BACKGROUND ART

As interest in environmental problems has been growing in recent years, much importance has been attached to countermeasures against exhaust gases from internal combustion engines such as automotive engines. If exhaust gases from internal combustion engines are emitted into the air as they are, problems such as pollution and environmental deterioration occur. Therefore, the exhaust gases are emitted into the air after purified by using exhaust gas purifying catalysts or the like.

Exhaust gas purifying catalysts are widely employed because they can achieve a drastic reduction in emissions without giving a burden to internal combustion engines such as engines which emit exhaust gases, when compared to other purifying methods.

The exhaust gas purifying catalysts are each produced by forming a porous carrier layer comprising a heat-resistant inorganic oxide or the like on a surface of a heat-resistant catalyst support substrate, and loading catalytic metal on this carrier layer. The exhaust gas purifying catalysts convert harmful nitrogen oxides (NOx), hydrocarbons (HC) and carbon monoxide (CO) contained in exhaust gases into harmless nitrogen, carbon dioxide and water under the action of the catalytic metal.

In recent years, exhaust gas purifying catalysts each formed by providing different characteristics to one exhaust gas purifying catalyst have been developed for the purposes of installability on a vehicle, cost reduction and so on.

Japanese Unexamined Patent Publication No. H8-114116 discloses a catalytic converter in which a low-oxygen activity zone is provided on an upstream side and a high-oxygen activity zone is provided on a downstream side. This catalytic converter comprises at least one of Pt, Pd and Rh as a catalytic metal and is formed so that the amount of this catalytic metal loaded is different between the low-oxygen activity zone and the high-oxygen activity zone.

Japanese Unexamined Patent Publication No. S61-78438 discloses an exhaust gas purifying monolithic catalyst comprising a catalyst layer having a carrier layer loaded on a monolithic catalyst support and a catalytic metal, wherein an inlet port side of the catalyst layer mainly comprises Pt and an outlet port side of the catalyst layer mainly comprises Pd. This exhaust gas purifying monolithic catalyst is produced by forming a catalyst carrier layer such as an alumina layer on a monolithic catalyst support and immersing this monolithic catalyst support formed with the catalyst carrier layer in an aqueous Pt solution from an end portion on an inlet port side and in an aqueous Pd solution from an end portion on an outlet port side, and burning it, thereby forming a catalyst layer.

Japanese Unexamined Patent Publication No. S62-68544 discloses an exhaust gas purifying monolithic catalyst comprising catalyst layers loaded on a monolithic catalyst support, wherein the catalyst layer on an inlet port side comprises an alumina layer containing Pt and Ce and the catalyst layer on an outlet port side comprises an alumina layer containing Pd and La and/or Nd.

Japanese Unexamined Patent Publication No. H4-276113 discloses a honeycomb catalyst on which a NOx reduction catalyst is loaded on an upstream side and a HC and CO oxidation catalyst is loaded on a downstream side with respect to the flow direction of exhaust gases.

In each of these two exhaust gas purifying catalysts, the carrier layers loaded with catalytic metals are formed of different materials. Namely, in each of these two exhaust gas purifying catalysts, the catalyst layers are formed by preparing slurries having different compositions, coating the slurries respectively for predetermined coating lengths from both end portions of a monolithic support catalyst, and burning the resultant.

As mentioned above, each of the exhaust gas purifying catalysts formed by providing different characteristics on one catalyst support substrate is produced by coating two kinds of coating fluids comprising slurries or catalytic metal solutions and respectively exhibiting different characteristics from both end portion sides of a catalyst support substrate such as a monolithic support. In actually producing an exhaust gas purifying catalyst, when a coating fluid is coated from one end portion side and then a different coating fluid is coated from the other end portion side the coating is carried out so that the coating fluids partially overlap each other. The coating method in which the coating fluids partially overlap each other is carried out in order to suppress exhaust gas purifying performance deterioration due to formation of a portion not coated with any coating fluids.

The conventional exhaust gas purifying catalysts have had a problem of incurring a loss of coating fluids at a coating fluid overlapping portion. The conventional catalysts also have had a problem of being unable to exhibit exhaust gas purifying performance as designed, because the coating fluids prepared so as to exhibit different characteristics overlap each other at the coating fluid overlapping portion. For example, in each of the exhaust gas purifying catalysts disclosed in Japanese Unexamined Patent Publication Nos. H8-114116 and S61-78438, different amounts of catalytic metal are loaded on one carrier layer, but when a portion loaded with a small amount of the catalytic metal and a portion loaded with a large amount of the catalytic metal overlap each other, the amount of the catalytic metal loaded at the overlapping portion increases above a design value.

Furthermore, the conventional catalysts have had a problem that when coating fluids are slurries for forming carrier layers, the thickness of the carrier layers at the coating fluid overlapping portion becomes large and exhaust gas passages become narrow. If the exhaust gas passages become narrow, pressure loss in passing exhaust gases becomes high and a burden is applied on an engine.

Namely, the conventional exhaust gas purifying catalysts have had problems of incurring a loss of materials constituting the coating fluids and lowering characteristics such as exhaust gas purifying performance and airflow performance below design values.

DISCLOSURE OF INVENTION

The present invention has been made in view of the above actual situations and it is an object of the present invention to provide an exhaust gas purifying catalyst capable of exhibiting designed characteristics without incurring a material loss.

The present inventors have further studied exhaust gas purifying catalysts in order to solve the above problems and, as a result, have found that the above problems can be solved by providing an exhaust gas purifying catalyst having a plurality of catalyst portions of different characteristics in the extending direction of cells, wherein the catalyst portions do not contact each other.

Namely, the exhaust gas purifying catalyst of the present invention is characterized in that the catalyst comprises a catalyst support substrate having a plurality of cells to be axially passed through by exhaust gases; a first catalyst portion having a first carrier layer formed on a surface of the cells of the catalyst support substrate and a first catalytic metal loaded on the first carrier layer; and a second catalyst portion having a second carrier layer formed on a surface of the cells of the catalyst support substrate where the first catalyst portion is not formed and a second catalytic metal loaded on the second carrier layer, and that the first catalyst portion and the second catalyst portion do not contact each other.

It is preferable that a third catalyst portion having a third carrier layer and a third catalytic metal loaded on the third carrier layer and/or an adsorption portion having an adsorbent is formed on a surface of the cells of the catalyst support substrate, and that the first catalyst portion and the second catalyst layer are formed on the third catalyst portion and/or the adsorption portion.

It is preferable that the distance between an end portion of the first carrier layer and an end portion of the second carrier layer is not more than 10 mm.

It is preferable that the first catalyst portion is provided on one end portion side of the catalyst support substrate, and that the second catalyst portion is provided on the other end portion side of the catalyst support substrate.

It is preferable that the catalyst support substrate is a monolithic honeycomb catalyst support.

BEST MODE FOR CARRYING OUT THE INVENTION

Figure 1:
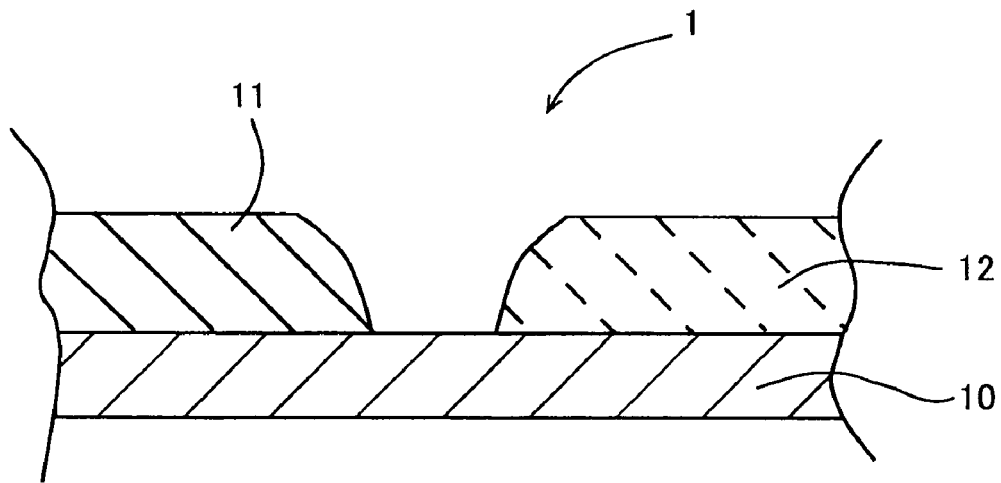
FIG. 1 is a cross-sectional view of a neighborhood of a cell wall of a roughly center portion of an exhaust gas purifying catalyst of Example 1.

Hereinafter, inventions which are in more concrete form of the abovementioned invention and embodiments of these inventions will be described.

Embodiments of the Invention

An exhaust gas purifying catalyst of the present invention comprises a catalyst support substrate, a first catalyst portion and a second catalyst portion. In the exhaust gas purifying catalyst of the present invention, the first catalyst portion and the second catalyst portion do not contact each other.

In the exhaust gas purifying catalyst of the present invention, since the first catalyst portion and the second catalyst portion do not contact each other, no catalyst portion is formed between the first catalyst portion and the second catalyst portion. In the exhaust gas purifying catalyst of the present invention, since no catalyst portion is formed between the first catalyst portion and the second catalyst portion, the first and the second catalyst portions do not overlap each other. Owing to this, a loss of materials required for producing the respective catalyst portions is not incurred and the respective catalyst portions can exhibit designed performance. Besides, since no carrier layer is formed between the first catalyst portion and the second catalyst portion, deterioration of airflow performance of cells caused by the overlap of the carrier layers can be suppressed.

The catalyst support substrate is a member having a plurality of cells to be axially passed through by exhaust gases. Namely, owing to its structure having a plurality of cells inside which exhaust gases pass through, an exhaust gas purifying catalyst can increase contact area with exhaust gases and improves in exhaust gas purifying performance. Examples of the exhaust gas purifying catalyst include a catalyst support substrate such as a monolith honeycomb support. The material of the catalyst support substrate can be those used for conventional exhaust gas purifying catalysts, and, for example, can be heat-resistant ceramics such as cordierite, and heat-resistant metals. A preferred catalyst support substrate is a monolith honeycomb catalyst support substrate.

Each of the first and the second catalyst portions has a carrier layer formed on a surface of cells of the catalyst support substrate, and a catalytic metal loaded on the carrier layer. The second catalyst portion is formed on a surface of the cells where the first catalyst portion is not formed.

The carrier layer and the catalytic metal constituting each of the first and the second catalyst portions are not particularly limited. Namely, it is possible to use those used as a carrier layer or a catalytic metal in conventional exhaust gas purifying catalysts.

In the exhaust gas purifying catalyst, the carrier layer is used in order to increase contact area with exhaust gases. It is possible to use a heat-resistant inorganic oxide used for ordinary exhaust gas purifying catalysts, and it is preferable that the heat-resistant inorganic oxide is at least one of alumina, silica, titania, zirconia, ceria and zeolite. A preferred carrier layer is a heat-resistant inorganic oxide mainly comprising activated alumina. It is also preferable that the carrier layer includes a conventionally known additive. Purifying characteristics of an exhaust gas purifying apparatus is improved by having the oxide as the carrier layer.

The catalytic metal is loaded on the carrier layer. This loading of the catalytic metal can be carried out either after a carrier layer is formed or by mixing a catalytic metal into a slurry comprising activated alumina or the like and coating the mixture on a metal support in forming a carrier layer. In the exhaust gas purifying catalyst, the catalytic metal is a component for purifying exhaust gases. As the catalytic metal, it is possible to use a catalytic metal used in ordinary exhaust gas purifying catalysts. Namely, it is possible to use any catalyst of oxidation catalysts, reduction catalysts, and three-way catalysts.

Specifically speaking, carbon monoxide (CO), hydrocarbons (HC), and nitrogen oxides (NOx) contained in exhaust gases can be efficiently removed by employing at least one of platinum (Pt), palladium (Pd), rhodium (Rh), gold (Au), silver (Ag) and iridium (Ir) as a catalytic metal. The amount of the catalytic metal loaded on the carrier layer is not particularly limited and can be appropriately selected in accordance with its use.

The first carrier layer and the first catalytic metal constituting the first catalyst portion and the second carrier layer and the second catalytic metal constituting the second catalyst portion are not particularly limited, respectively.

Namely, the first carrier layer and the second carrier layer can be formed of either the same material or different materials. Besides, the thickness of the first carrier layer and the thickness of the second carrier layer are not particularly limited and can be either the same or different thicknesses. The first carrier layer and the second carrier layer can be appropriately selected and formed in accordance with the respective purposes of the first catalyst portion and the second catalyst portion.

Similarly to the above carrier layers, the first catalytic metal and the second catalytic metal can be either the same or different catalytic metals. Moreover, the amount of the first catalytic metal loaded and the amount of the second catalytic metal loaded are not particularly limited and can be either the same or different amounts. The first catalytic metal and the second catalytic metal can be appropriately selected and formed in accordance with the respective purposes of the first catalyst portion and the second catalyst portion.

In the exhaust gas purifying catalyst of the present invention, the first catalyst portion and the second catalyst portion form an inner surface of cells. Namely, the first catalyst portion and the second catalyst portion can be formed directly on a surface of the cells or at least part of them can be formed on an underlayer catalyst portion which is different in characteristics from the respective catalyst portions. This underlayer catalyst portion can be an adsorption portion having an adsorbent. Moreover, the first catalyst portion and the second catalyst portion can be formed on a member produced by laminating an underlayer catalyst portion and an adsorption portion.

When the first catalyst portion and the second catalyst portion are formed directly on an underlayer catalyst portion which is different in characteristics from the respective catalyst portions, this underlayer catalyst portion can be uninterrupted or can be divided into a plurality, in the extending direction of the cells. It is preferable that the underlayer catalyst portion is uninterrupted in the extending direction of the cells.

It is preferable that a third catalyst portion having a third carrier layer and a third catalytic metal loaded on the third carrier layer and/or an adsorption portion having an adsorbent is formed on a surface of the cells of the catalyst support substrate, and that the first catalyst portion and the second catalyst layer are formed on the third catalyst portion and/or the adsorption portion.

The third carrier layer and the third catalytic metal constituting the third catalyst portion are not particularly limited, respectively, in a similar way to the first catalyst portion and the second catalyst portion.

The material of the adsorbent contained in the adsorption portion is not particularly limited. For example, it is possible to employ an adsorbent which adsorbs HC in conventional exhaust gas purifying catalysts. Examples of the adsorbent include zeolite.

In the exhaust gas purifying catalyst of the present invention, it is preferable that the distance between an end portion of the first carrier layer and an end portion of the second carrier layer is not more than 10 mm. If the distance between the end portion of the first carrier layer and the end portion of the second carrier layer exceeds 10 mm, a portion not formed with any catalyst portion increases, the exhaust gas purifying performance deteriorates and the exhaust gas purifying performance per volume of the catalyst support substrate of the exhaust gas purifying catalyst deteriorates. The distance between the end portion of the first carrier layer and the end portion of the second carrier layer is preferably 1 to 5 mm.

As used herein, the distance between the end portion of the first carrier layer and the end portion of the second carrier layer is the distance between an end portion of the first catalyst layer and an end portion of the second catalyst layer in an exhaust gas flow direction (the extending direction of the cells of the catalyst support substrate) in the exhaust gas purifying catalyst. Concretely speaking, in an exhaust gas purifying catalyst in which the first catalyst portion is provided on an upstream side and the second catalyst portion is provided on a downstream side with respect to an exhaust gas flow direction, it means the distance between a downstream end portion of the first carrier layer and an upstream end portion of the second carrier layer located on an exhaust gas downstream side of the downstream end portion of the first carrier layer.

In the exhaust gas purifying catalyst of the present invention, the number of catalyst portions in the extending direction of the cells is not particularly limited as long as it is two or more. Namely, the exhaust gas purifying catalyst of the present invention has only to have a structure in which the catalyst has a plurality of catalyst portions in the extending direction of the cells and the respective catalyst portions do not contact their neighboring catalyst portions. Preferably, the number of catalyst portions is two in view of ease of producing the catalyst portions. Namely, it is preferable that the first catalyst portion is provided on one end portion side of the catalyst support substrate and that the second catalyst portion is provided on the other end portion side of the catalyst support substrate.

In the exhaust gas purifying catalyst of the present invention, it is preferable that the first catalyst portion comprises a first carrier layer comprising alumina and a first catalytic metal comprising Pd and that the second catalyst portion comprises a second carrier layer comprising zirconia and a second catalytic metal comprising Rh. If this first catalyst portion and this second catalyst portion are produced so as to overlap each other, their effects are not fully exhibited at the overlapping portion and designed exhaust gas purifying performance cannot be obtained. Concretely speaking, initial performance of an exhaust gas purifying catalyst is sometimes improved by placing Pd, which is excellent in HC purifying performance (oxidizes HC), on an exhaust gas flow upstream side of the exhaust gas purifying catalyst, but when a Rh-containing catalyst portion overlaps this Pd-containing catalyst portion, effects of loading the respective catalysts are reduced because Rh is a catalyst having a strong reduction effect.

The production method of the exhaust gas purifying catalyst of the present invention is not limited and the exhaust gas purifying catalyst of the present invention can be produced by using conventionally known production methods. For example, a production method of an exhaust gas purifying catalyst having two catalyst portions will be shown.

First, two kinds of slurries which can form a first catalyst portion and a second catalyst portion are prepared. One slurry of these two slurries is introduced into cells from one end portion side of a catalyst support substrate, coated for a predetermined length and dried. Subsequently, the other slurry is coated from the other end portion of the catalyst support substrate for a predetermined length which does not make a contact with the end portion of the one slurry and dried. Then the resultant is burned at a predetermined temperature, thereby producing two catalyst portions.

Or, the first catalyst portion and the second catalyst portion can be produced by forming carrier layers comprising an inorganic oxide or the like and then loading catalyst metals by immersing the carrier layers respectively in catalytic metal solutions and burning the resultant.

EXAMPLES

Hereinafter, the present invention will be described by way of examples.

Exhaust gas purifying catalysts were produced as examples of the present invention. Note that the exhaust gas purifying catalyst of the present invention is not limited to these examples.

Example 1

A slurry A was prepared by weighing 100 g of activated alumina powder, 30 g of acidic alumina sol containing 40 wt % alumina, a platinum nitrate solution and 100 g of water and stirring them uniformly. The platinum nitrate solution constituting this slurry A was added so that the slurry coated on a monolith honeycomb support contained 1.0 g of Pt in terms of Pt.

A slurry B was prepared by weighing 100 g of activated alumina powder, 30 g of acidic alumina sol containing 40 wt % alumina, a rhodium nitrate solution and 100 g of water and stirring them uniformly. The rhodium nitrate solution constituting this slurry B was added so that the slurry coated on a monolith honeycomb support contained 0.2 g of Rh in terms of Rh.

Then, a monolith honeycomb support formed of cordierite (outer diameter: 109 mm, length: 107 mm, the number of cells: 93 cells/cm$^2$ (600 cells/inch$^2$) was immersed in the slurry A from one end portion (one end surface) to half the length (53 mm). At this time, the fluid level of the slurry A was perpendicular to the extending direction of the cells of the monolith honeycomb support.

After the monolith honeycomb support was taken out of the slurry A, excessive slurry was blown off by blowing the air from an upper end surface of the monolith honeycomb support where the slurry A was not coated. Then, the slurry A coated on the monolith honeycomb support was dried at 250° C. for one hour. The amount of the slurry A coated was 100 g per liter of the apparent volume of the monolith honeycomb support.

The monolith honeycomb support with the slurry A dried was coated with the slurry B for a length of 49 mm from the other end portion where the slurry A was not coated. Coating of the slurry B was executed by similar means to that of coating of the slurry A. Then, the slurry B was also dried in a similar way to the slurry A. The amount of the slurry B coated was 100 g per liter of the apparent volume of the monolith honeycomb support.

After dried, the resultant was burned at 500° C. for one hour.

In this way, an exhaust gas purifying catalyst of this example was produced.

In the exhaust gas purifying catalyst of this example, a first carrier layer comprising activated alumina was formed for a length of 53 mm from one end portion of the monolith honeycomb support, and Pt was loaded on the first carrier layer. In addition, a second carrier layer comprising activated alumina was formed for a length of 49 mm from the other end portion of the monolith honeycomb support, and Rh was loaded on the second carrier layer. In the exhaust gas purifying catalyst 1 of this example, a first catalyst portion 11 and a second catalyst portion 12 do not contact each other and a gap of 5 mm is formed between them. Through this gap of 5 mm, the monolith honeycomb support 10 is exposed. A cross section of a neighborhood of a cell wall of a roughly center portion of the exhaust gas purifying catalyst of Example 1 was shown in FIG. 1.

Example 2

A slurry C was prepared by weighing 100 g of activated alumina powder, 30 g of acidic alumina sol containing 40 wt % alumina and 100 g of water and stirring them uniformly.

A slurry D was prepared by weighing 100 g of activated alumina powder, 30 g of acidic alumina sol containing 40 wt % alumina and 100 g of water and stirring them uniformly.

Then, the slurry C was coated on a similar monolith honeycomb support to the one used in Example 1 by using similar means to the means used in Example 1 for a length of 53 mm from one end portion, and dried at 250° C. for one hour. The amount of the slurry C coated was 100 g per liter of the apparent volume of the monolith honeycomb support.

Subsequently, the monolith honeycomb support coated with the slurry C was coated with the slurry D by using similar means to the means used in Example 1 for a length of 49 mm from one end portion and dried at 250° C. for one hour. The amount of the slurry D coated was 100 g per liter of the apparent volume of the monolith honeycomb support.

After dried, the resultant was burned at 500° C. for one hour. Thereby carrier layers were formed on the monolith honeycomb support.

1 L of a platinum nitrate solution was prepared and the monolith honeycomb support formed with the carrier layers was immersed in this platinum nitrate solution. This immersion was carried out so as to immerse only the carrier layer produced from the slurry C. After taken out, the resultant was air-dried. Owing to this immersion, 1.0 g of Pt was loaded on the carrier layer produced from the slurry C.

1 L of a rhodium nitrate solution was prepared and the monolith honeycomb support formed with the carrier layers was immersed in this rhodium nitrate solution. This immersion was carried out so as to immerse only the carrier layer produced from the slurry D. After taken out, the resultant was air-dried and then dried at 250° C. for one hour. Owing to this immersion, 0.2 g of Rh was loaded on the carrier layer produced from the slurry D.

In this way, an exhaust gas purifying catalyst of this example was produced.

In the exhaust gas purifying catalyst of this example, a first carrier layer comprising activated alumina was formed for a length of 53 mm from one end portion of the monolith honeycomb support, and Pt was loaded on the first carrier layer. In addition, a second carrier layer comprising activated alumina was formed for a length of 49 mm from the other end portion of the monolith honeycomb support, and Rh was loaded on the second carrier layer. A first catalyst portion and a second catalyst portion do not contact each other and a gap of 5 mm was formed between them. Through this gap of 5 mm, the monolith honeycomb support is exposed.

Comparative Example 1

An exhaust gas purifying catalyst was produced in a similar way to Example 1, except that the slurry B was coated for a length of 64 mm.

Figure 2:
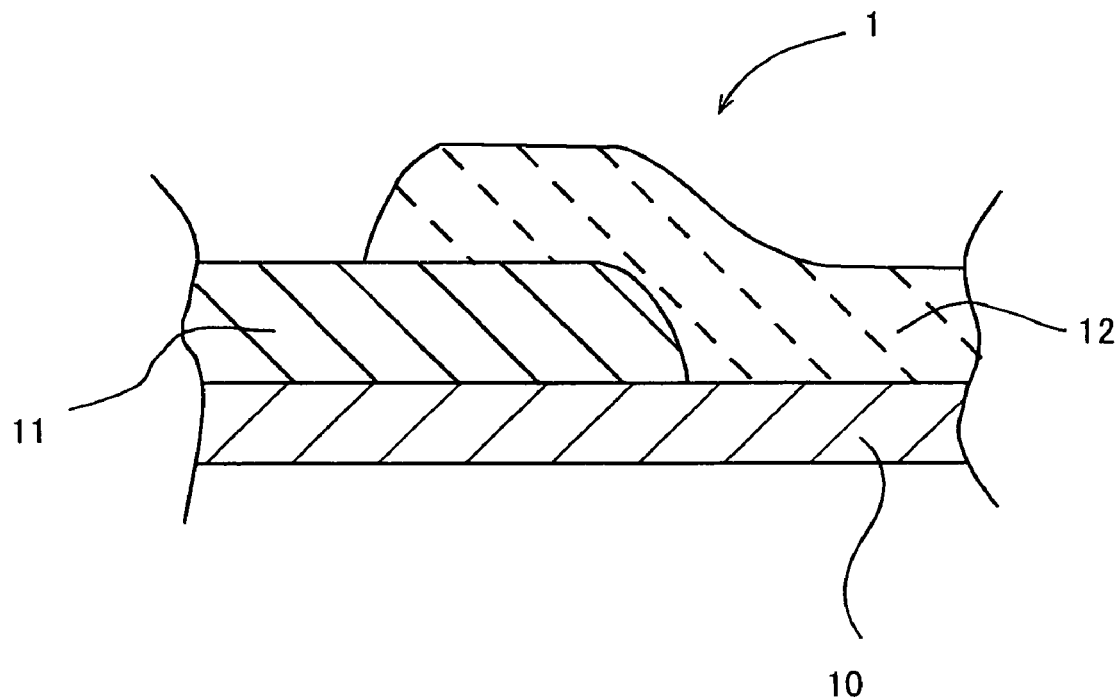
FIG. 2 is a cross-sectional view of a neighborhood of a cell wall of a roughly center portion of an exhaust gas purifying catalyst of Comparative Example 1.

In this exhaust gas purifying catalyst 1 of this comparative example, a first carrier layer comprising activated alumina was formed for a length of 53 mm from one end portion of a monolith honeycomb support 10, and Pt was loaded on the first carrier layer. In addition, a second carrier layer comprising activated alumina was formed for a length of 64 mm from the other end portion of the monolith honeycomb support, and Rh was loaded on the second carrier layer. In the exhaust gas purifying catalyst 1 of this comparative example, an end portion of a first catalyst portion 11 and an end portion of a second catalyst portion 12 overlap each other for 10 mm. This overlap was caused by forming the second catalyst portion 12 on a surface of the first catalyst portion 11. A cross section of a roughly center portion of the exhaust gas purifying catalyst of this comparative example was shown in FIG. 2.

Comparative Example 2

An exhaust gas purifying catalyst was produced in a similar way to Example 2, except that the slurry D was coated for a length of 64 mm.

In the exhaust gas purifying catalyst of this comparative example, a first carrier layer comprising activated alumina was formed for a length of 53 mm from one end portion of a monolith honeycomb support, and Pt was loaded on the first carrier layer. In addition, a second carrier layer comprising activated alumina was formed for a length of 64 mm from the other end portion of the monolith honeycomb support, and Rh was loaded on the second carrier layer. In the exhaust gas purifying catalyst of this comparative example, an end portion of a first catalyst portion and an end portion of a second catalyst portion overlap each other for 10 mm. This overlap was caused by forming the second catalyst portion on a surface of the first catalyst portion provided on the monolith honeycomb support.

(Evaluation)

Pressure loss was measured to evaluate the exhaust gas purifying catalysts of the examples and the comparative examples.

The pressure loss measurement was carried out by passing gases through each of the exhaust gas purifying catalysts at a constant flow rate, measuring gas pressure before and after passing through each of the exhaust gas purifying catalysts and regarding a difference in pressure as pressure loss. Concretely speaking, using a pressure loss measuring apparatus comprising a suction pump, and a holding means for holding an exhaust gas purifying catalyst with cells of the exhaust gas purifying catalyst communicating with the suction pump, the air was suctioned at a flow rate of 5 $m^3$/min by operating the suction pump. Then, pressure loss was measured as a difference between air pressure after passing through the cells of the exhaust gas purifying catalyst and atmospheric pressure. The measurement results were shown in Table 1.

TABLE 1

| | PRESSURE LOSS (KPa) |
| --- | --- |
| EX. 1 | 1.47 |
| EX. 2 | 1.46 |
| COMP. EX. 1 | 1.54 |
| COMP. EX. 2 | 1.53 |

As shown in Table 1, the exhaust gas purifying catalysts of the respective examples had smaller pressure loss than those of the exhaust gas purifying catalysts of the respective comparative examples. Namely, the exhaust gas purifying catalysts of the respective examples are suppressed from increasing in pressure loss when exhaust gases pass through cells of the exhaust gas purifying catalysts in practical use.

In contrast, in the exhaust gas purifying catalysts of the respective comparative examples, an end portion of the first catalyst portion and an end portion of the second catalyst portion overlap each other in a neighborhood of a center portion in an exhaust gas flow direction. This overlapping portion has a greater thickness. Namely, the opening area of the cells became smaller at this overlapping portion. Due to this, pressure loss became high.

Moreover, in the exhaust gas purifying catalysts of the respective examples, the respective catalyst portions were formed as designed. Namely, no loss of the slurries or the catalytic metals was incurred. In contrast, in the exhaust gas purifying catalysts of the respective comparative examples, the first catalyst portion located under the second catalyst portion does not fully exhibit its purifying performance at the overlapping portion, because of being suppressed from contacting exhaust gases. In addition, in the exhaust gas purifying catalyst of Comparative Example 4, carrier layers were formed and then the catalytic metals were loaded by immersing the carrier layers in the catalytic metal solutions. However, when the carrier layers were immersed in the catalytic metal solutions, the solutions penetrated into wider ranges of the carrier layers than desired ranges by capillary action, and as a result the catalytic metals were loaded in wider ranges than the designed ranges. Namely, the exhaust gas purifying catalysts of the respective comparative examples cannot obtain designed purifying performance.

Furthermore, in the exhaust gas purifying catalyst of each of the examples, parts where the first and the second catalyst portions were formed and parts where no catalyst portion was formed and the monolith honeycomb support is exposed are different in cell opening area by the thickness of either of the catalyst portions. Namely, the flow of exhaust gases which have entered the exhaust gas purifying catalyst from one end portion side and have passed a first half part formed with the first catalyst portion is disturbed by a change in cell opening area, and the disturbed flow is to pass a second half part formed with the second catalyst portion. Namely, because the flow of the exhaust gases is disturbed in the second half part, the exhaust gases more easily contact the second catalyst portion. Especially, exhaust gases flowing through a neighborhood of each cell center portion are difficult to contact the first catalyst portion, i.e., to be purified, but the disturbance of the exhaust gas flow allows the exhaust gases to contact the second catalyst portion and be purified from its harmful components. As a result, the exhaust gas purifying catalyst of each of the examples shows an effect of improving the exhaust gas purifying performance.

Moreover, the exhaust gas purifying catalyst of each of the above examples was produced by coating the slurry A and the slurry C on a monolith honeycomb support and drying them at 250° C. and then coating the slurry B and the slurry D and drying them at 250° C. The slurry A and the slurry C coated on the monolith honeycomb support can be dried also by air because they do not overlap each other. In contrast, the exhaust gas purifying catalyst of each of the comparative examples requires drying at 250° C. because the slurry A and the slurry C overlap each other. Namely, the exhaust gas purifying catalyst of each of the above examples also has an effect of reducing cost required for drying slurries in production.

Example 3

Figure 3:
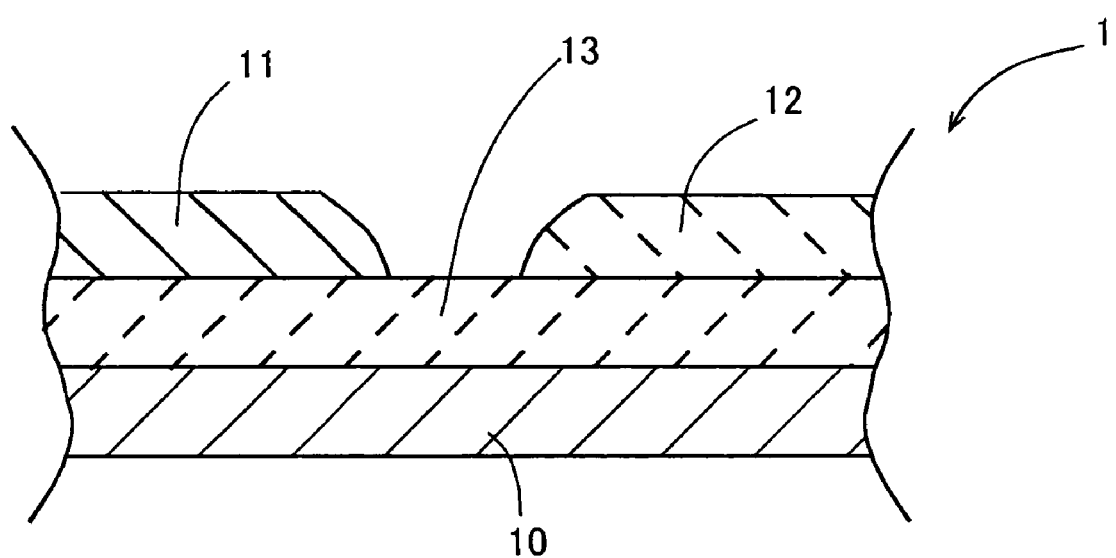
FIG. 3 is a cross-sectional view of a neighborhood of a cell wall of a roughly center portion of an exhaust gas purifying catalyst of Example 3.

This example is an embodiment other than the above respective examples. Concretely speaking, this example is an exhaust gas purifying catalyst in which first and second catalyst portions are formed on a third catalyst portion. Its cross section was shown in FIG. 3.

A slurry E was prepared by weighing 100 g of activated alumina powder, 30 g of acidic alumina sol containing 40 wt % of alumina, a platinum nitrate solution and 100 g of water and stirring them uniformly. The platinum nitrate solution constituting this slurry E was added so that the slurry coated on the monolith honeycomb support contained 1.0 g of Pt in terms of Pt.

Then, the slurry E was coated on a similar monolith support to the one used in Example 1 for a full length and dried at 250° C. for one hour. The amount of the slurry E coated was 100 g per liter of the apparent volume of the monolith honeycomb support. After dried, the resultant was burned at 500° C. for one hour.

A slurry F was prepared by weighing 100 g of activated alumina powder, 30 g of acidic alumina sol containing 40 wt % of alumina, a palladium nitrate solution and 100 g of water and stirring them uniformly. The palladium nitrate solution constituting this slurry F was added so that the slurry coated on the monolith honeycomb support contained 1.0 g of Pd in terms of Pd.

A slurry G was prepared by weighing 100 g of zirconium oxide powder, 30 g of zirconium oxide sol containing 40 wt % of zirconium oxide, a rhodium nitrate solution and 100 g of water and stirring them uniformly. The rhodium nitrate solution constituting this slurry G was added so that the slurry coated on the monolith honeycomb support contained 0.2 g of Rh in terms of Rh.

Then, the above monolith honeycomb support coated with the slurry E was coated with the slurry F by using a similar means to the means used in Example 1 for a length of 53 mm from one end portion and dried at 250° C. for one hour. The amount of the slurry F coated was 100 g per liter of the apparent volume of the monolith honeycomb support.

Subsequently, the above monolith honeycomb support coated with the slurry E was coated with the slurry D by a similar means to the means used in Example 1 for a length of 49 mm from one end portion and dried at 250° C. for one hour. The amount of the slurry D coated was 100 g per liter of the apparent volume of the monolith honeycomb support.

The monolith honeycomb support with the slurry E dried was coated with the slurry F for a length 49 mm from the other end portion not coated with the slurry E. This coating of the slurry F was carried out by a similar means to the means used for coating the slurry E. Then, the slurry F was also dried in a similar way to the slurry E. The amount of the slurry F coated was 100 g per liter of the apparent volume of the monolith honeycomb support After dried, the resultant was burned at 500° C. for one hour.

In this way, an exhaust gas purifying catalyst of this example was produced.

The exhaust gas purifying catalyst 1 of this example is provided with a third catalyst portion 13, which was produced by forming a third carrier layer comprising alumina on a surface of cells of a monolith honeycomb support 10 and loading Pt on the this third carrier layer. A first carrier layer comprising activated alumina was formed on a surface of this third catalyst portion 13 for a length of 53 mm from one end portion and Pd was loaded on the first carrier layer. Namely, a first catalyst portion 11 was formed on a surface of the third catalyst portion. In addition, a second carrier layer comprising zirconium oxide was formed on a surface of the third catalyst portion 13 of the monolith honeycomb support for a length of 49 mm from the other end portion and Rh was loaded on the second carrier layer. Namely, a second catalyst portion 12 was formed on a surface of the third catalyst portion. In the exhaust gas purifying catalyst 1 of this example, the first catalyst portion 11 and the second catalyst portion 12 do not contact each other and a gap of 5 mm was formed between them. Through this gap of 5 mm, the third catalyst portion 13 is exposed.

The exhaust gas purifying catalyst 1 of this example had a similar structure to those of the exhaust gas purifying catalysts of the above Examples 1 and 2, except that the first catalyst portion and the second catalyst portion 12 were formed on the third catalyst portion 13. Namely, the exhaust gas purifying catalyst 1 of this example obtained similar effects to those of the exhaust gas purifying catalysts of the above Examples 1 and 2.

The invention claimed is:

1. An exhaust gas purifying catalyst which is characterized in that the catalyst comprises:
   a catalyst support substrate having a plurality of cells to be axially passed through by exhaust gases;
   a first catalyst portion having a first carrier layer formed on a surface of the cells of the catalyst support substrate and a first catalytic metal loaded on the first carrier layer; and
   a second catalyst portion having a second carrier layer formed on a surface of the cells of the catalyst support substrate where the first catalyst portion is not formed and a second catalytic metal loaded on the second carrier layer,
   the first catalyst portion and the second catalyst portion do not contact each other, and a gap is provided between the first catalyst portion and the second catalyst portion in an axial direction relative to the catalyst support substrate.

2. The exhaust gas purifying catalyst set forth in claim 1, wherein a third catalyst portion having a third carrier layer and a third catalytic metal loaded on the third carrier layer and/or an adsorption portion having an adsorbent is formed on a surface of the cells of the catalyst support substrate, and
   the first catalyst portion and the second catalyst portion are formed on the third catalyst portion and/or the adsorption portion.

3. The exhaust gas purifying catalyst set forth in claim 1, wherein the distance between an end portion of the first carrier layer and an end portion of the second carrier layer is not more than 10 mm.

4. The exhaust gas purifying catalyst set forth in claim 1, wherein the first catalyst portion is provided on one end portion side of the catalyst support substrate, and the second catalyst portion is provided on the other end portion side of the catalyst support substrate.

5. The exhaust gas purifying catalyst set forth in claim 1, wherein the catalyst support substrate is a monolithic honeycomb catalyst support.

6. The exhaust gas purifying catalyst set forth in claim 1, wherein the gap between the first catalyst portion and the second catalyst portion is 5 mm.

\* \* \* \* \*

UNITED STATES PATENT AND TRADEMARK OFFICE
CERTIFICATE OF CORRECTION

PATENT NO. : 7,759,290 B2 Page 1 of 1
APPLICATION NO. : 12/084985
DATED : July 20, 2010
INVENTOR(S) : Katsunori Murabayashi It is certified that error appears in the above-identified patent and that said Letters Patent is hereby corrected as shown below:

Title Page, Item (22)

Please change "November 21, 2006" to --November 21, 2005--.

Signed and Sealed this

Twenty-sixth Day of October, 2010

David J. Kappos
*Director of the United States Patent and Trademark Office*